United States Patent
Hashimoto

(10) Patent No.: US 10,525,621 B2
(45) Date of Patent: Jan. 7, 2020

(54) SYNTHETIC RESIN MOLDED-ARTICLE AND METHOD FOR MOLDING SAME

(71) Applicant: KASAI KOGYO CO., LTD., Kanagawa (JP)

(72) Inventor: Shinya Hashimoto, Ebina (JP)

(73) Assignee: KASAI KOGYO CO., LTD., Koza-Gun, Kanagawa (JP)

( * ) Notice: Subject to any disclaimer, the term of this patent is extended or adjusted under 35 U.S.C. 154(b) by 79 days.

(21) Appl. No.: 15/541,627

(22) PCT Filed: Jun. 19, 2015

(86) PCT No.: PCT/JP2015/003080
§ 371 (c)(1),
(2) Date: Jul. 5, 2017

(87) PCT Pub. No.: WO2016/116969
PCT Pub. Date: Jul. 28, 2016

(65) Prior Publication Data
US 2017/0334109 A1    Nov. 23, 2017

(30) Foreign Application Priority Data
Jan. 23, 2015   (JP) ................. 2015-010847

(51) Int. Cl.
*B32B 3/10* (2006.01)
*B29C 45/00* (2006.01)
(Continued)

(52) U.S. Cl.
CPC ...... *B29C 45/0046* (2013.01); *B29C 45/0025* (2013.01); *B29C 45/2602* (2013.01);
(Continued)

(58) Field of Classification Search
None
See application file for complete search history.

(56) References Cited

U.S. PATENT DOCUMENTS

| | | |
|---|---|---|
| 2009/0239038 A1 | 9/2009 | Nagashima et al. |
| 2014/0027946 A1 | 1/2014 | Nagashima et al. |

FOREIGN PATENT DOCUMENTS

| | | |
|---|---|---|
| CN | 102632850 A | 8/2012 |
| DE | 102009013789 A1 | 9/2009 |

(Continued)

OTHER PUBLICATIONS

Machine translation of JP07-296609 (Year: 1995).*
(Continued)

*Primary Examiner* — Christopher M Polley
(74) *Attorney, Agent, or Firm* — United IP Counselors, LLC

(57) ABSTRACT

A molding method for a synthetic resin molding reduces a disturbed flow of molten resin at a side edge of a molding body during injection molding, and allows the design surface of the molding body to have aesthetic appearance. The synthetic resin molding includes a bend arranged on a side edge of the molding body and bending toward its back surface, and a flange protruding laterally from the bend and including a notch. The molding method includes arranging a gate at a position corresponding to an end of one side of the flange in a longitudinal direction and performing injection molding using a colored resin material containing a luster agent kneaded in the material, and forming a thin portion of the bend in a longitudinal direction of the bend to form a groove on a back surface of the bend.

3 Claims, 3 Drawing Sheets

(51) Int. Cl.
*B29C 45/26* (2006.01)
*B29K 505/02* (2006.01)
*B29K 105/16* (2006.01)
*B29L 31/30* (2006.01)

(52) U.S. Cl.
CPC .. *B29C 45/0013* (2013.01); *B29C 2045/0027* (2013.01); *B29K 2105/16* (2013.01); *B29K 2505/02* (2013.01); *B29K 2995/002* (2013.01); *B29K 2995/0022* (2013.01); *B29L 2031/3044* (2013.01)

(56) References Cited

FOREIGN PATENT DOCUMENTS

| JP | H06-262647 A | | 9/1994 |
|----|--------------|---|--------|
| JP | 07296609 A | * | 11/1995 |
| JP | H07-296609 A | | 11/1995 |
| JP | H07-304071 A | | 11/1995 |
| JP | 3074185 U | | 10/2000 |
| JP | 2011-146227 A | | 7/2011 |
| JP | 2011146227 A | * | 7/2011 |
| JP | 2012-166634 A | | 9/2012 |
| JP | 2012-255113 A | | 12/2012 |
| JP | 2014-166699 A | | 9/2014 |

OTHER PUBLICATIONS

Machine translation of 2011146227 (Year: 2011).*
International Search Report for International Application No. PCT/JP2015/003080 dated Aug. 11, 2015, Japan, 2 pp.
Office Action for corresponding German application No. 11 2015 006 035.9 dated Mar. 12, 2019, 5 pages.

* cited by examiner

SYNTHETIC RESIN MOLDED-ARTICLE AND METHOD FOR MOLDING SAME

CROSS-REFERENCE TO RELATED APPLICATIONS

This application is a National Stage Entry application of PCT International Application No. PCT/JP2015/003080, filed on Jun. 19, 2015, which claims the priority benefit of Japanese Patent Application No. 2015-010847, filed on Jan. 23, 2015, the entire contents of both of which are hereby incorporated by reference.

BACKGROUND

1. Technical Field

The present invention relates to a synthetic resin molding used as an automotive interior decorative component, such as an automotive trim, and a molding method for the synthetic resin molding.

2. Description of the Background

Synthetic resin moldings used as automotive interior decorative components may be injection-molded pieces with a high quality appearance of metallic luster using a metallic colored resin material, which is a resin material into which a luster agent containing metallic powder, such as aluminum powder, has been kneaded.

A synthetic resin molding formed by injection molding can typically have weld lines, or flow lines, resulting from a disturbed flow of the molten resin. For a molding formed using a metallic colored resin material, in particular, a disturbed flow of the molten resin can disturb the orientation of the luster agent. This can destabilize the color tones and cannot produce intended design effects.

Techniques have been known to prevent such weld lines in synthetic resin moldings formed by injection molding. One technique described in, for example, Japanese Unexamined Patent Application Publication No. 7-304071 (hereinafter referred to as "Patent Literature 1") allows the resin injected through a plurality of gates to flow uniformly along a continuous thin portion on a back surface portion of a molding corresponding to the gates.

BRIEF SUMMARY

A synthetic resin molding such as an automotive trim that is mounted to cover the surface of a counterpart panel has a bend bending toward its back surface at one side edge of its plate-like trim body, and a flange protruding laterally from the bend. The bend and the flange are continuous with each other along the length of the side edge. The flange serves as a mounting member with which the molding is mounted onto the counterpart panel.

The flange has notches for receiving peripheral protrusions shaped in correspondence with the contours of the counterpart panel. This allows fitting between the corresponding surfaces.

In this manner, the plate-like automotive trim has a complex and irregular outer shape with the flange having the notches. The flange is continuous with the bend arranged in its peripheral portion. In this structure, the molten resin can flow in a disturbed manner and create weld lines, which can then affect the flow in the trim body.

For a molding formed using a metallic colored resin material, in particular, a disturbed flow of the molten resin can disturb the orientation of the luster agent, and can greatly degrade the design effects. This is unavoidable even with the technique described in Patent Literature 1.

One or more aspects of the present invention are directed to a molding method for a synthetic resin molding that reduces a disturbed flow of molten resin at a complex and irregularly shaped peripheral portion of a molding body during injection molding and allows the design surface of the molding body to have aesthetic appearance in the synthetic resin molding including the molding body, a bend arranged on its peripheral portion and bending toward its back surface, and a flange continuous with the bend and having notches, and are also directed to the synthetic resin molding obtained with the molding method.

A molding method for a synthetic resin molding according to one aspect of the present invention is a molding method for a synthetic resin molding including a molding body, a bend arranged on a side edge of the molding body and bending toward a back surface of the molding body, and a flange protruding laterally from the bend. The flange includes a notch. The method includes arranging a gate at a position corresponding to an end of one side of the flange in a longitudinal direction and performing injection molding using a colored resin material containing a luster agent kneaded in the material, and forming a thin portion of the bend extending in a longitudinal direction of the bend to form a groove on a back surface of the bend.

A synthetic resin molding according to another aspect of the present invention is a synthetic resin molding including a molding body, a bend arranged on a side edge of the molding body and bending toward a back surface of the molding body, and a flange protruding laterally from the bend. The flange includes a notch. The synthetic resin molding is an injection-molded piece formed using a gate arranged at a position corresponding to an end of one side of the flange in a longitudinal direction, and comprising a colored resin material containing a luster agent kneaded in the material. The synthetic resin molding includes a thin portion of the bend extending in a longitudinal direction of the bend to form a groove on a back surface of the bend.

The synthetic resin molding and the molding method according to embodiments of the present invention allow uniform flow of a molten colored resin material containing a luster agent kneaded in the material into an area corresponding to the molding body when the material is injected through a gate arranged at a position corresponding to an end of the flange during injection molding of the synthetic resin molding by allowing the material to temporarily narrow in an area corresponding to a thin portion of the bend.

This structure reduces any disturbed flow of the molten resin that can occur at a corner connecting the flange and the bend or around each notch of the flange in an area corresponding to the thin portion, and prevents the disturbed flow from affecting the flow in the molding body.

This allows the design surface of the molding body to have aesthetic appearance, and enhances the design effects of the synthetic resin molding, without creating weld lines on the surface of the molding body or disturbing the orientation of the luster agent in the colored resin material.

Further, any weld line or any disturbance in the orientation of the luster agent created on the joint between the flange and the bend is covered with an edge cover, such as a welt. Also, the thin portion of the bend forms a groove on its back surface. This prevents the appearance from deteriorating.

DETAILED DESCRIPTION

Embodiments of the present invention will be described with reference to the drawings.

Figure 1:
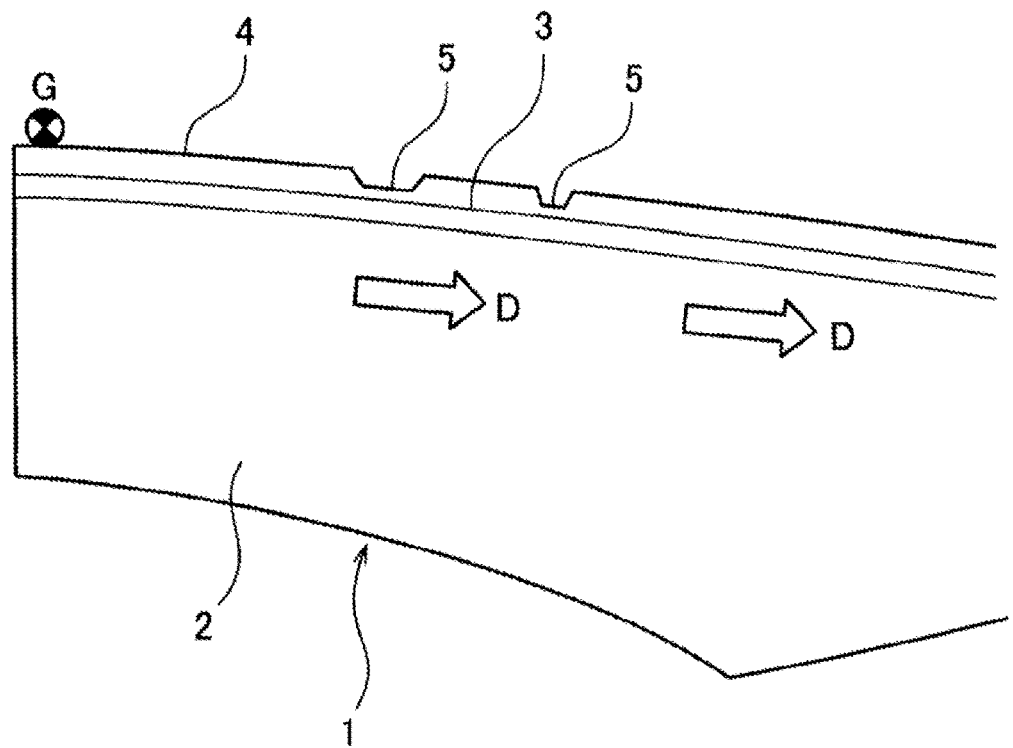
FIG. 1 is an explanatory side view of a synthetic resin molding according to a first embodiment of the present invention.

FIG. 1 shows an automotive trim 1, which is a synthetic resin molding according to one embodiment of the present invention. The automotive trim 1 is injection-molded into an intended shape with a mold using an appropriate synthetic resin material. The automotive trim 1 serves as an interior decorative component for covering and decorating an automotive panel surface (not shown), and also as a shock-absorber for an occupant of the automobile in the event of, for example, a collision.

In the present embodiment, the automotive trim 1 is molded with a mold using a metallic colored resin material, which is a resin material into which a luster agent containing metal powder, such as aluminum powder, has been kneaded. A trim body 2 for covering the typical surface of the automotive body panel is shaped into a plate with an intended thickness to add high quality metallic luster to the surface.

Figure 2:
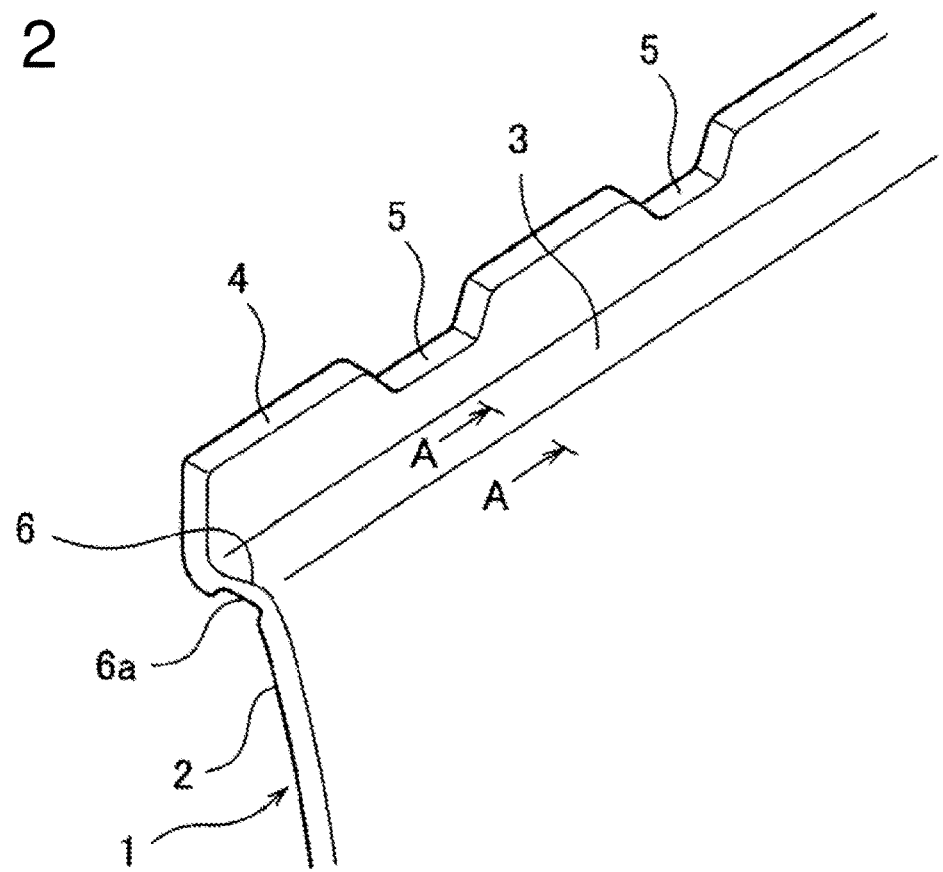
FIG. 2 is an explanatory enlarged perspective view of the synthetic resin molding shown in FIG. 1 showing its main components.

As shown in FIG. 2 as well, the trim body 2 has, at its one side edge, or for example at its upper edge, a bend 3, which bends toward its back surface, and a flange 4, which protrudes upward from the bend 3. The bend 3 and the flange 4 are continuous in the longitudinal direction. The flange 4 serves as a mounting member with which the molding is mounted onto the counterpart panel.

The flange 4 has notches 5 for receiving peripheral protrusions shaped in correspondence with the contours of the counterpart panel. This allows fitting between the corresponding surfaces.

When the plate-like automotive trim 1 is formed by injection molding, the gate of the mold (not shown) is positioned as indicated by letter G in FIG. 1, which corresponds to a predetermined position at an end of one side of the flange 4 in the longitudinal direction, to prevent a gate mark from being left on a design surface of the trim.

During injection molding, the molten resin material injected from the gate position G flows in the cavity of the mold from the area corresponding to the flange 4 toward the areas corresponding to the bend 3 and the trim body 2 while spreading across the plate surface.

As described above, the trim body 2 has, at its side edge, the bend 3 and the flange 4 extending linearly from the bend 3. With the flange 4 having the complex and irregular shape including the notches 5, the flow of the molten resin injected from the gate position G can be disturbed particularly at each notch 5 by the corresponding protrusion on the core mold surface.

Figure 3:
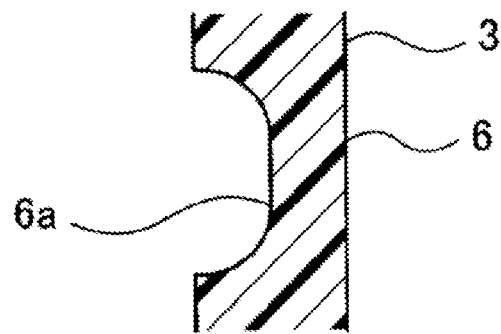
FIG. 3 is an explanatory cross-sectional view taken along line A-A in FIG. 1.

In the present embodiment, the bend 3 has a thin portion 6 extending in the longitudinal direction as shown in FIGS. 2 and 3. The thin portion 6 corresponds to a groove 6a with an intended width and an intended depth at the back surface of the bend 3, which is shaped in correspondence with a protrusion on the core mold surface of the mold (not shown).

When the automotive trim 1 is formed by injection molding, a molten metallic colored resin material is injected from the gate position G, which corresponds to a position at an end of one side of the flange 4 in the longitudinal direction. As described above, the injected molten metallic colored resin material flows into the cavity of the mold from the area corresponding to the flange 4 toward the areas corresponding to the bend 3 and the trim body 2 while spreading across the plate surface.

The flow of the molten resin material from an area corresponding to the flange 4 toward the trim body 2 temporarily narrows in a portion of the bend 3 corresponding to the thin portion 6 along the protrusion on the core mold surface for forming the groove 6a on the back surface of the bend 3. This allows the molten resin to uniformly flow into the area corresponding to the trim body 2.

This structure reduces any disturbed flow of the molten resin that can occur at a corner connecting the flange 4 and the bend 3 or around each notch 5 of the flange 4 in an area corresponding to the thin portion 6, and prevents the disturbed flow of the molten resin from affecting the flow in the trim body 2.

This allows the orientation of the luster agent to be substantially uniform from the gate position G toward the downstream of the molten resin flow as indicated by the arrow D in FIG. 1, without creating weld lines on the surface of the trim body 2 or disturbing the orientation of the luster agent in the metallic colored resin material.

Figure 4:
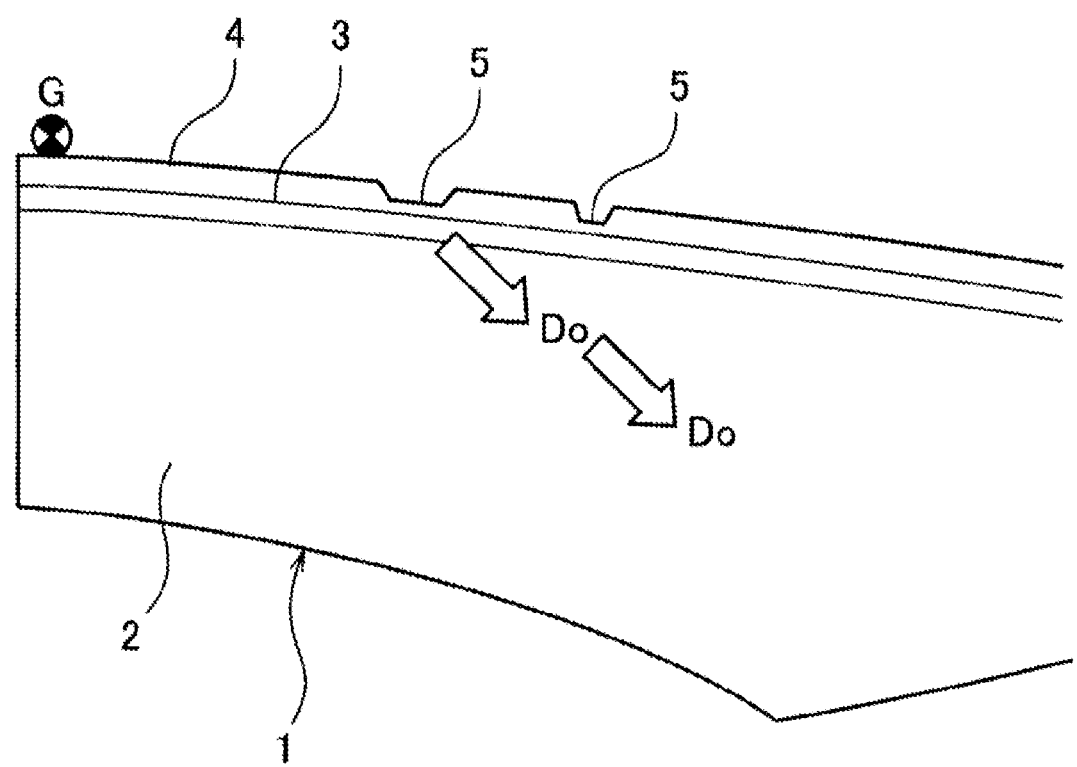
FIG. 4 is an explanatory side view of a synthetic resin molding of a comparative example shown in the same manner as in FIG. 1.

FIG. 4 shows a synthetic resin molding according to a comparative example of the present embodiment. In this comparative example, a bend 3 has no thin portion 6.

This structure of the comparative example causes the flow of the molten resin injected from the gate position G during injection-molding to be disturbed by the protrusion on the core mold surface arranged in the area corresponding to each notch 5 of the flange, and thus easily creates weld lines.

For the molding formed using the metallic colored resin material, in particular, the luster agent flows obliquely from the bend 3 toward the trim body 2 as indicated by the arrow Do in FIG. 4 with the weld lines being created in the areas corresponding to the notches 5. This can cause irregular orientation of the luster agent and can degrade the color tones and luster.

In the present embodiment, as described above, the orientation of the luster agent is uniform without being disturbed in the areas corresponding to the notches 5. The design surface of the trim body 2 can have aesthetic appearance, and enhance the design effects.

Figure 5:
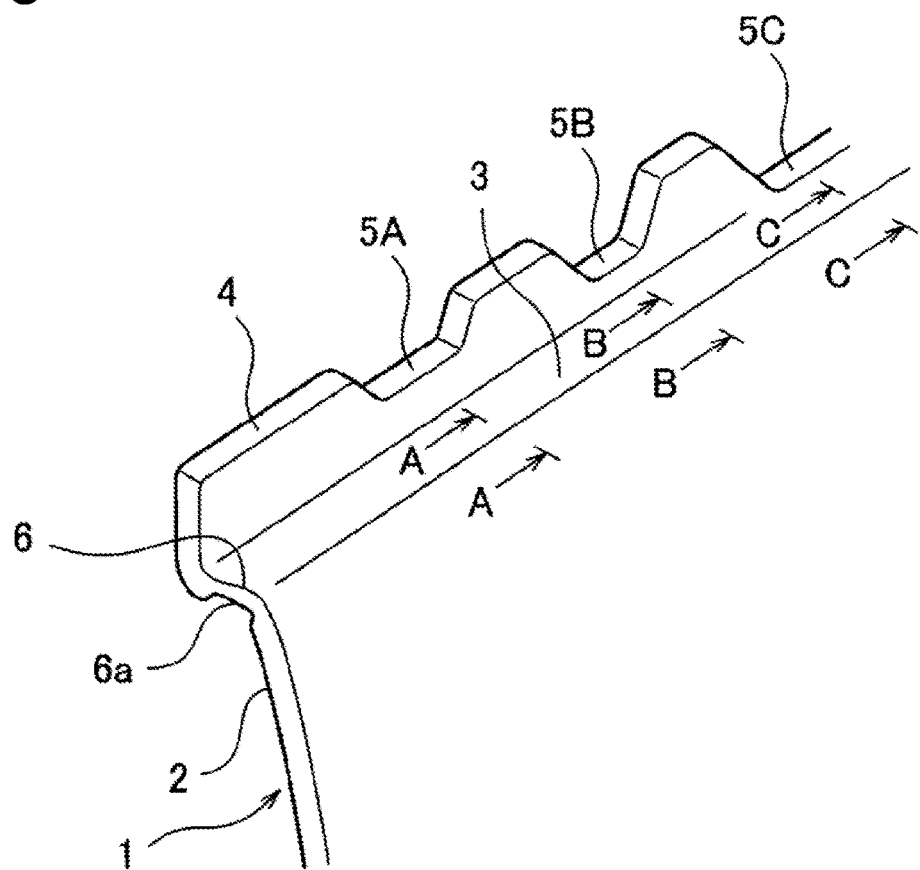
FIG. 5 is an explanatory perspective view of a synthetic resin molding according to a second embodiment of the present invention shown in the same manner as in FIG. 2.
Figure 6A:
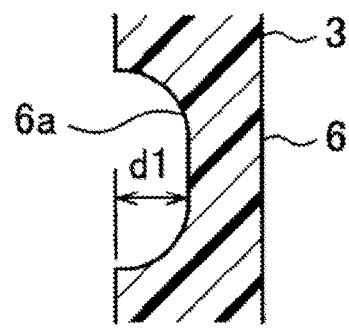
FIG. 6A is an explanatory cross-sectional view taken along line A-A in FIG. 5.
Figure 6B:
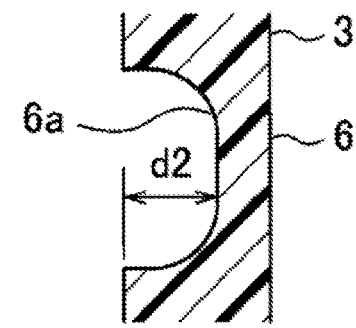
FIG. 6B is an explanatory cross-sectional view taken along line B-B in FIG. 5.
Figure 6C:
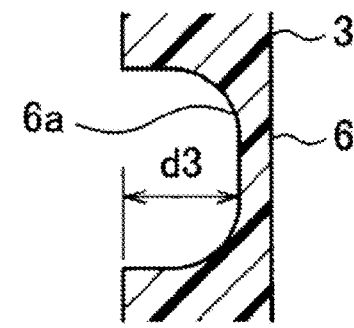
FIG. 6C is an explanatory cross-sectional view taken along line C-C in FIG. 5.

FIGS. 5 and 6 show a synthetic resin molding according to a second embodiment of the present invention. In the second embodiment, when the flange 4 has a plurality of notches 5 with the differing depths of 5A<5B<5C, the corresponding areas in the groove 6a on the back surface of the thin portion 6 have the increasing groove depths of d1<d2<d3.

In the second embodiment, the notches 5B and 5C of the flange 4 are deeper than the notch 5A. The cavity of the mold defines the areas corresponding to the notches 5B and 5C in the groove 6a on the back surface of the thin portion 6 to have greater depths in the order of d1, d2, and d3.

The core mold surface of the mold has protrusions for forming the notches 5. The protrusions are larger in the areas corresponding to notches 5B and 5C having greater notch depths, and can easily create weld lines during injection molding. The core mold surface also has the protrusion for forming the groove 6a in the thin portion 6. The protrusion is larger in the areas corresponding to the notches 5B and 5C to form the groove 6a having greater depths in the order of d2 and d3.

This structure allows the molten resin material flowing from the flange 4 toward the trim body 2 during injection-molding to further narrow its flow in the areas corresponding to the notches 5B and 5C, which have greater notch depths. This prevents a disturbed flow from affecting the flow in the trim body 2.

The structure including the notches 5 even with differing depths prevents weld lines in the flange 4 from affecting the flow in the trim body 2, and the orientation of the luster agent in the metallic colored resin material from being disturbed by such weld lines, and allows the design surface of the trim body 2 to have aesthetic appearance.

Although the synthetic resin molding 1 as an automotive trim is described as an example of the synthetic resin molding according to the present embodiment, the synthetic resin molding may be any of other various synthetic resin decorative components, in addition to an automotive trim.

The resin material may not be a metallic colored resin material, and may be a general-purpose colored resin material containing no luster agent to produce the same advantageous effects as described above.

REFERENCE SIGNS LIST 1 automotive trim (synthetic resin molding)
2 trim body (molding body)
3 bend
4 flange
5, 5A, 5B, 5C notch
6 thin portion
6a groove
G gate position
D orientation direction of luster agent
d1, d2, d3 groove depth

The invention claimed is:

1. A molding method for a synthetic resin molding, the method comprising:
   preparing a mold configured to form the synthetic resin molding, the synthetic resin molding including a molding body having a side edge, a bend arranged on the side edge and bending in a direction orthogonal to a longitudinal direction of the molding body, the bend including a groove at the back surface of the bend, the groove extending along a longitudinal direction of the side edge, a flange extending upward from the bend, the flange including a notch, the mold including a gate at a position corresponding to an end of the flange; and
   injecting a colored resin material from the gate into the mold, the colored resin material containing a luster agent kneaded in the material.

2. The molding method for the synthetic resin molding according to claim 1, wherein the flange includes a plurality of notches with differing notch depths, and
   the grooves have groove depths corresponding to notches having notch depths.

3. The molding method for the synthetic resin molding according to claim 2, wherein the grooves have greater groove depths corresponding to notches having greater notch depths in the length direction.

* * * * *